June 17, 1958 H. FORMENTO 2,839,162
LUBRICATING SYSTEM
Filed Aug. 7, 1952
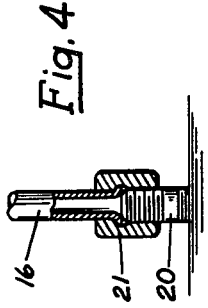
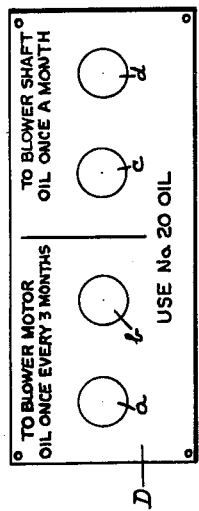
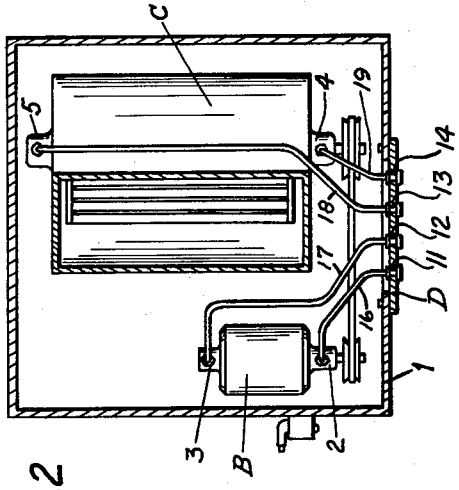
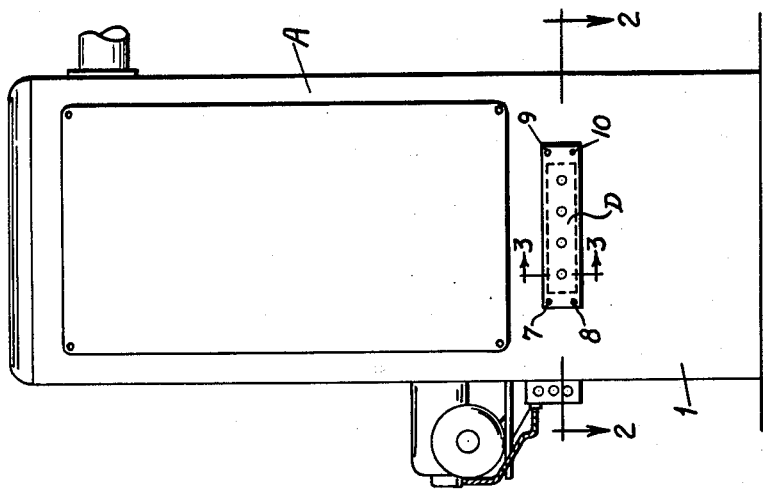
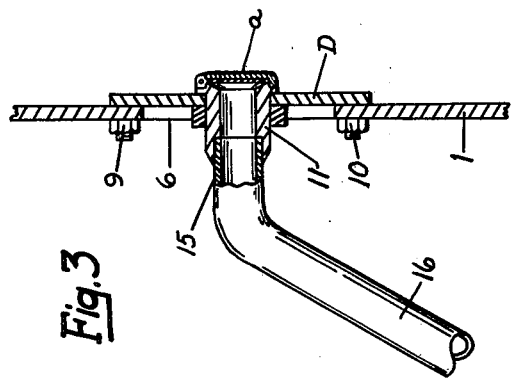
INVENTOR.
HERBERT FORMENTO
BY
ATTORNEY

2,839,162
LUBRICATING SYSTEM

Herbert Formento, Port Washington, N. Y.

Application August 7, 1952, Serial No. 303,103

1 Claim. (Cl. 184—105)

This invention relates to a lubricating system and more particularly and specifically to such a system for lubricating the bearings, of motors or the like, which are remotely positioned within a housing and are difficult of access.

The primary object of the invention is the provision of a system or arrangement by which bearings located within a closed housing can be lubricated from a point exterior of the housing.

Another object of the invention is the provision of such a system which can be quickly and easily associated with apparatus now in use as well as with newly produced apparatus.

A still further object of the invention is the provision of a system of the character described which is comparatively cheap and simple of production and installation yet highly efficient in operation.

Other objects and advantages of the invention will appear from the following description when read in the light of the accompanying drawings.

In the drawings:

Fig. 1 is a view in front elevation of a furnace or air conditioner.

Fig. 2 is a horizontal sectional view on the line 2—2 of Fig. 1 looking in the direction indicated by arrows.

Fig. 3 is an enlarged fragmentary view, partly in vertical section, taken on the line 3—3 of Fig. 1 looking in the direction indicated by arrows.

Fig. 4 is a detailed view, mostly in section, showing the connection of a lubricant conducting conduit to a bearing.

Fig. 5 is a front view of the plate forming a part of the system.

It is usual and common practice to completely enclose the motors forming a part of many devices such as for instance oil-fired furnaces and like devices and as a consequence thereof it is extremely difficult to reach the bearings of the motor and blower of such a device with the result that the bearings of these devices are not regularly and adequately lubricated and injury including the burning out of the motor often occurs.

The present invention comprises a simple arrangement or mechanism which can be quickly and easily attached to new as well as devices already in use to provide a simple and efficient manner for lubricating the bearings which are difficult of access due to their being positioned within the completely enclosed and above-referred to housing.

In the drawings an oil-fired furnace often referred to as a winter air conditioner is illustrated with the present invention in association therewith but it is to be understood that the inventive concept can be utilized in connection with any apparatus embodying a closed or housed unit having therein bearings which are difficult to lubricate.

Referring to the drawings and utilizing like characters and reference numerals to designate similar parts, the furnace or air conditioner is designated as an entirety by A and inasmuch as this device is conventional in nature specific description thereof is unnecessary.

In a device of this character the apparatus is substantially completely enclosed in a housing the front wall 1 of which being the only one with which the present invention is concerned. It is quite common not to provide any door to provide access to the lower end of the housing in which is positioned the electric motor B for driving the fan within the blower unit C. Consequently it is extremely difficult to reach for the necessary periodic lubrication the bearings 2 and 3 at the opposite ends of the motor and the bearings 4 and 5 at the opposite ends of the blower. Oil cups or the like are provided for all of these bearings but the difficulty of reaching them is obvious.

In carrying out the present invention a rectangular opening 6 is cut from the front wall 1 of the housing above but adjacent the lower end thereof and is closed by a plate D secured in place by bolts 7, 8, 9 and 10 or the like positioned at the corners of the plate.

This plate along its length is provided with four oil cups 11, 12, 13 and 14 each of which is suitably secured to the plate and provided at its outer end and external of the plate with hinged closure caps which are designated a, b, c and d. A conduit is associated with each oil cup and, see Fig. 3, has its end 15 suitably secured to the inner end of the oil cup. These conduits are designated 16, 17, 18 and 19 and it will be seen that the first mentioned goes to the motor bearing 2; the second mentioned to the motor bearing 3; the third mentioned to the blower bearing 5; and the last mentioned to the blower bearing 4.

It is common and usual practice on these bearings to provide an upwardly or outwardly extending threaded pipe or nipple 20, see Fig. 4, and each of the conduits has an end detachably secured to its respective nipple by a nut 21.

It is desirable, although not essential, that certain indicia be carried on the plate D and such is illustrated in Fig. 5 where it will be seen that in respect to the conduits leading to the motor a notation is provided to the effect that lubricant should be provided once every three months while to the blower bearings there is a notation that they should be lubricated once a month. There is also a notation as to the type of lubricant that should be used.

It will be seen that the system or arrangement can be assembled as a unit by assembling the oil cups with their respective conduits to the plate D and then applying the plate to the housing front wall after the opening 6 has been provided therein. The remote ends of the conduit carrying the nuts 21 can be secured to their respective bearing nipples 20. By detaching or loosening the nuts 21 and the bolts securing the plate D in place the system or arrangement can be quickly removed or detached should this be necessary for any reason.

The plate D could be painted or colored to agree with that of the housing but it might be found desirable to make it of a contrasting color to call attention to the necessity of periodically lubricating the motor and the blower bearings.

By the use of the present arrangement the motor and blower bearings can be easily and properly lubricated by following the instructions carried on the indicia of the plate and furthermore over-lubrication will be avoided as this can be harmful to the motor to the extent that it would cause it to burn out just as would be the case where there is inadequate lubrication. This is an advantage over where there have been endeavors to provide for automatic lubrications which due to mechanical failure can either under or over lubricate.

The present arrangement provides a means for proper lubrication by the operator who rarely is a mechanic or mechanically inclined and thus provides an easy means for proper maintenance of a motor and blower.

Departures from the specific arrangement illustrated and described as well as the particular apparatus with which it is associated can be made without departing from the inventive concept.

What I claim is:

In a machinery arrangement including a closed housing having therein a motor provided with a plurality of bearings which by reason of the position of the motor in the housing are difficult of access even upon entry being made into the housing, a plate removably secured to and closing an aperture in said housing, said aperture and its closure plate being located above the uppermost motor bearing enclosed in the housing, a plurality of lubricant conducting conduits each having an end secured to the plate and each having an end detachably secured to a bearing of said motor, means accessible from the front of the plate exteriorly of the housing normally closing the ends of said conduits secured in said plate, and said closing means being quickly and easily manually openable exteriorly of said housing whereby a lubricant may be selectively delivered into said conduits for gravity flow to said bearings for the controlled lubrication thereof.

References Cited in the file of this patent

UNITED STATES PATENTS

| | | |
|---|---|---|
| 1,542,875 | Haney | June 23, 1925 |
| 1,795,297 | Dirkes | Mar. 10, 1931 |
| 1,885,500 | Williamson | Nov. 1, 1932 |
| 2,274,473 | Davis | Feb. 24, 1942 |